United States Patent

Bryant et al.

[15] 3,656,118

[45] Apr. 11, 1972

[54] READ/WRITE SYSTEM AND CIRCUIT FOR SEMICONDUCTOR MEMORIES

[72] Inventors: Richard W. Bryant, Poughkeepsie; George K. Tu, Wappingers Falls, both of N.Y.

[73] Assignee: Cogar Corporation, Wappingers Falls, N.Y.

[22] Filed: May 1, 1970

[21] Appl. No.: 33,554

[52] U.S. Cl. ....................................340/173 FF, 340/174 DA

[51] Int. Cl. ....................................H03r 19/08, G11c 11/00

[58] Field of Search ......................340/174, 173, 166, 174 DA

[56] References Cited

UNITED STATES PATENTS 3,440,444 4/1969 Rapp ....................................340/174

2,911,631 11/1959 Warren....................................340/174

*Primary Examiner*—Thomas A. Robinson

*Attorney*—Harry M. Weiss

[57] ABSTRACT

This disclosure relates to a system and semiconductor circuit for reading out of and writing into selected storage cells of a semiconductor memory. In particular, the disclosure relates to such a system and circuit wherein a group of cells utilizes a single decoder for both the read and write operations. The use of a single decoder for a group of cells is accomplished by utilizing both the in-phase and out-of-phase outputs of each decoder to minimize the number of logic stages required.

24 Claims, 3 Drawing Figures

INVENTORS RICHARD W BRYANT
GEORGE K TU

ATTORNEY Harry M Weiss

READ/WRITE SYSTEM AND CIRCUIT FOR SEMICONDUCTOR MEMORIES

BACKGROUND OF THE INVENTION

1. Field of the Invention

This invention relates generally to semiconductor memories. In particular, it relates to reading out of and writing into semiconductor storage cells arranged in an orthogonal plurality of words and a plurality of bit arrays, wherein each storage cell has a specific address determined by the word and bit array in which it is contained.

2. Description of the Prior Art

Semiconductor memories wherein each storage or memory cell has a particular address have long been known in the prior art. Usually, the memory cells are arranged in a plurality of words, each word having a plurality of bits, and the address is determined by the particular word and bit array in which the cell is located. Thus, when it was desired to read a particular memory cell, a word line connected to all of the memory cells in the word in which such memory cell was located was activated as well as a bit/sense line connected to all of the memory cells of the same bit array in which such memory cell was located. In a similar manner, writing into the memory cell was achieved by simultaneously activating the desired word line and bit/sense line.

The number of different addresses in such memories depended upon the number of words and the number of bits in each word. To select the proper bit array, one decoder system was required for the write operation and another decoder system was required for the read operation. Thus, if in a particular memory, each word contained 8 bits, 16 decoder systems were required to perform the entire read/write operation, i.e., 8 decoder systems for selection of the proper bit during read out and 8 decoder systems for selection of the proper bit during write in.

The many devices required for the numerous decoder systems dissipated too much power, and required too much area in a monolithic chip which could affect yield. It thus became necessary to develop an improved means to select a bit in such a memory for the read/write operation.

It was considered desirable to provide a decode and drive/sense circuit arrangement which permitted the use of the same number of decoders to the corresponding number of bits. However, it was not previously possible to achieve this desired result with a maximum of circuit speed.

SUMMARY OF THE INVENTION

Accordingly, it is an object of this invention to provide a system and circuit having fewer decoders for reading from and writing into cells of a semiconductor memory.

It is a further object of this invention to provide a system and circuit for reading from and writing into cells of a semiconductor memory which has reduced power dissipation and device area.

It is still another object of this invention to provide an improved high speed system and circuit for selecting and reading or writing into cells of a semiconductor memory.

DESCRIPTION OF THE PREFERRED EMBODIMENTS

In accordance with the preferred embodiment of this invention a semiconductor memory is comprised of a plurality of words, with each word containing a plurality of bits. A different word drive signal is connected to the cells comprising each word and, when present, permits the bits in the word to respond to a read or write signal. Different bit/sense lines are connected to each array of bits.

Each array of bits has a single decoder comprised of an emitter-coupled logic decoder circuit. The out-of-phase output of this decoder circuit is connected to inputs of bit-driver gates, and the in-phase output of the decoder circuit is connected as the emitter circuit of a differential amplifier. The outputs of all the memory cells in each array of bits are connected, through bit/sense line, to the inputs of the differential amplifier. Data inputs and a write signal are connected to the remaining inputs of the bit drive gates. When a bit array is selected for the read/write operation, the in-phase decoder output provides a low impedance for the emitter circuit of the differential amplifier, thereby enabling the differential amplifier. The out-of-phase decoder output enables the bit driver gate by providing an open circuit to the gate inputs to which it is connected.

The bit driver gates are connected to the bit drivers which are connected to appropriate terminals of the memory cell for setting it to the "zero" or "one" state. When the write signal is high and the "zero" data input is high, the bit driver, which sets the memory cell to the "zero" state, is activated and a "-zero" will be written into the memory cell. If the "one" data input had been high, and the write signal is high, a "one" would have been written into the memory cell through the other bit driver. During the read operation, the write signal is in the "zero" state and the bit driver gates are inhibited while the differential amplifier remains enabled. Under these circumstances, the memory cell outputs will be detected through the differential amplifier and the information in the selected cell will thus be read.

The foregoing, and other objects, features and advantages of the invention, will be apparent from the following, more particular description of the preferred embodiment of the invention, as illustrated in the accompanying drawings.

BRIEF DESCRIPTION OF THE FIGURES

Referring to FIG. 1, the memory comprises an orthogonal matrix of semiconductor memory cells 10. As shown in the figure, each horizontal array of memory cells 10 comprises a word and each vertical array of memory cells 10 comprises an array of bits. Thus each memory cell 10 has a specified address given by the particular word and bit array in which it is contained.

Figure 1:
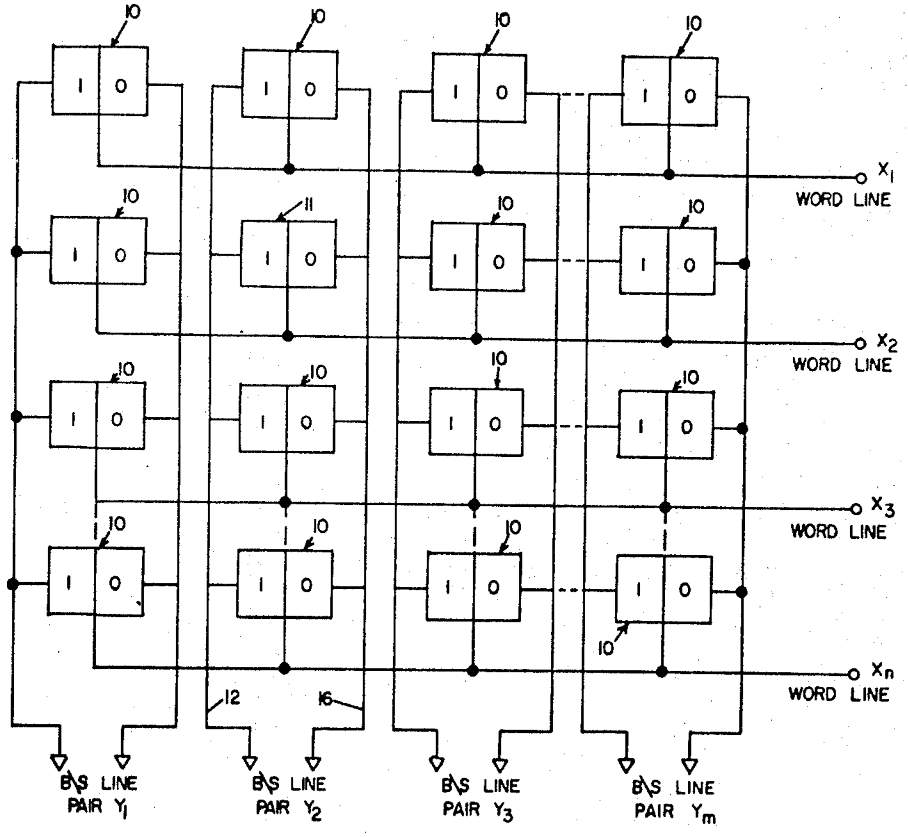
FIG. 1 is a diagram depicting the connection of word lines and bit/sense lines to the memory cells of a memory.
Figure 2:
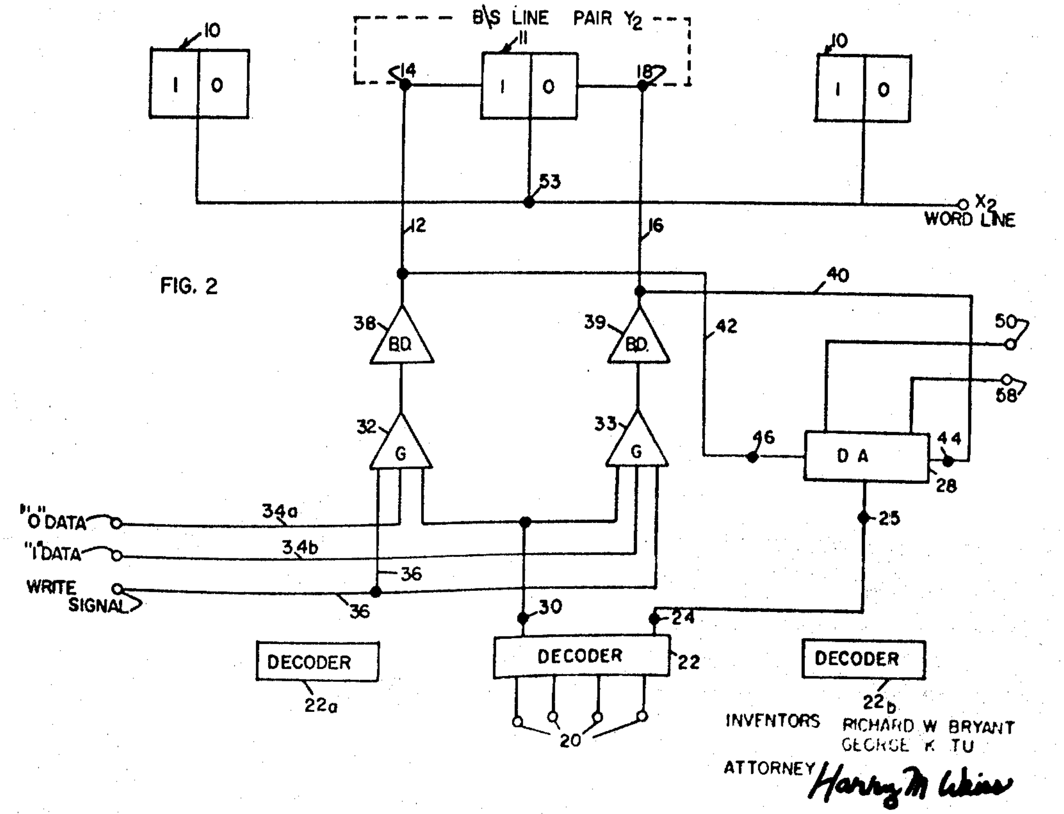
FIG. 2 is a block diagram depicting the system for reading from and writing into a memory cell in accordance with this invention.

A word drive signal is connected through word line 0 to each of the memory cells 10 in the first word, and in a similar manner, word lines $X_1$ through $X_n$ are connected to all of the memory cells in a particular word associated with the word line. Bit/sense line (pair)Y*l* are connected to each of the memory cells in the first bit array, and in a similar manner bit/sense line 1 through *y* are each connected to all of the memory cells in a particular bit array. Each of the bit/sense lines are connected to the outputs of a memory cell and to the outputs of bit drivers so that the memory cells are read and written into through them. As will become apparent later in the specification, the presence of a word driver signal at the memory cells in a word enables those words to respond to a read and/or write signal which may appear along the bit sense line. Thus, for example, if it is desired to read or write from or into a particular memory cell 11, a word drive signal is transmitted through bit/sense line $Y_2$, i.e., through line 12 or 16, (see FIG. 2). The in-phase output 24 of decoder 22 is connected to a gating input 25 of a differential amplifier 28. The out-of-phase output 30 of the decoder 22 is connected to both an input of a bit driver gate 32 and an input of a bit driver gate 33. A write signal is connected to another input of the bit driver gate 32 and the bit driver gate 33. A "zero" data input is connected to a third input of bit driver gate 32 and a "one" data input is connected to a third input of the bit driver gate 33.

The decoder 22 is designed such that when all of its inputs 20 are in the down or "zero" state, its in-phase output 24 will also be in the down or "zero" state and the out-of-phase output 30 will be in the up or "one" state. When any of the inputs 20 are up, the out-of-phase output 30 is in the "zero" state, and the in-phase output 24 is in the "one" state. Each of the bit driver gates 32 or 33 is designed such that if any of its inputs are in the "zero" state, its output is in the "zero" state. If all of the bit driver gate inputs are in the "one" state, the output is in the "one" state.

The output of bit driver gate 32 is connected to the input of a bit driver 38, and the output of bit driver 38 is connected to the output 14 of the memory cell 11 through the line or conductor 12. The output of bit driver gate 33 is connected to the input of a bit driver 39. The output of bit driver 39 is connected through the line or conductor 16 to the output 18 of the memory cell 11. Thus, bit drivers 38 and 39 transmit any signal that may emanate from bit driver gates 32 and 33, respectively, to the memory cell 11 to set the memory cell 11 to a "one" or a "zero," depending upon the state of the outputs from the bit driver gates.

The output 14 of the memory cell 11 is connected through lines 12 and 42 to an input 46 of the differential amplifier 28. The output 18 of the memory cell 11 is connected through lines 16 and 40 to another input 44 of the differential amplifier 28. The differential amplifier 28 is designed such that, when the signal at its gating input 25 is in the "zero" state, its output 50 will be in the "zero" state and its output 58 will be in the "one" state, if the input 46 is greater than the input 44. When the gating input 25 is at the "zero" state and the input 44 is greater than the input 46, the output 50 is in the "one" state and the output 58 is in the "zero" state. When the gating input 25 is in the "one" state both outputs 50 and 58 are in the "one" state regardless of the relative magnitudes of the voltages at the inputs 46 and 44.

The memory cell 11 is designed such that when a word drive signal appears at terminal 53 it will be set to the "zero" state by a drive signal appearing at the output 14 and will be set to the "one" state by a drive signal appearing at the output 18. Thus if there is no word/drive signal at the terminal 53, both outputs 14 and 18 of the memory cell 11 will be in the "zero" state. Under these conditions, if a drive signal appears at the output 14 or 18, the voltage thereat will not affect the state of the memory cell 11.

READ OPERATION

When memory cell 11 is to be read or written into, the inputs 20 to the decoder circuit 22 are all in the "zero" state. Thus the in-phase output 24 of the decoder is in the "zero" state and the out-of-phase output 30 is in the "one" state. Assuming that the memory cell 11 is to be read, the write signal will be in the "zero" state and thus both bit driver gates 32 and 33 will be inhibited by the presence of the "zero" signal at their inputs from the connection to the write signal and the outputs of the bit driver gates 32 and 33 will both be in the "-zero" state. In this case, there will be no input to the bit drivers 38 and 39 and thus no drive signal to the memory cell 11. Under these circumstances, the voltage at the output 14 of the memory cell 11 is transmitted to the input 46 of differential amplifier 28 through the lines 12 and 42 and the output 18 of the memory cell 11 is transmitted through the lines 16 and 40 to the other input 44 of the differential amplifier 28. Since the in-phase out-put 24 of the decoder 22 is in the "zero" state the signal at the gating input 25 of the differential amplifier 28 is in the "zero" state and the state of the outputs 50 and 58 will be determined by the relative values of the voltages at the output 14 and the output 18 of the memory cell 11 as they appear at the inputs 46 and 44, respectively, of the differential amplifier 28. Thus, if the memory cell 11 had been in the "one" state the output 14 would have been higher than the output 18 and the output 50 of the differential amplifier 28 would have been in the "zero" state and the output 58 of the differential amplifier 28 would have been in the "one" state. If the memory cell 11 had been in the "zero" state, the state of the outputs 50 and 58 of the differential amplifier 28 would have been reversed.

WRITE OPERATION

During the write operation, the write signal is in the "one" state and thus the inhibition from the bit driver gates 32 and 33 is removed. If a "zero" is to be written into the memory cell 11, the "zero" data signal will be in an up state and the "one" data signal will be in a down state. Since the out-of-phase output 30 of the decoder 22 is in the up or "one" state, all of the inputs to the bit driver gate 32 are in the up or "one" state and thus the output of the bit driver gate 32 is also in the up or "one" state. Because the "one" data input is in the down state, the output of the gate 33 is in the down or "zero" state and no drive signal is transmitted through line 16 to the output 18 of the memory cell 11. Because the output of the bit driver gate 32 is in the up or "one" state a signal is transmitted through the bit driver 38 to line 12 and to the output 14 of the memory cell 11. The presence of the drive signal at the output 14 sets the memory cell 11 to the "zero" state. If it had been desired to write a "one" into the memory cell 11, the "one" data signal would have been in the up state. This would have caused the state of the bit driver gates 32 and 33 to have been reversed and a drive signal would have appeared at the output 18 instead of the output 14 of the memory cell 11 and the memory cell would have thus been set to a "one" instead of to a "zero".

In the above description of the system's operation, it was assumed that there was a word/drive signal through the word line $X_2$. If there had been no such word/drive signal present at the terminal 53, the state of the cell would have been unaffected regardless of the remainder of the system shown in FIG. 2, and thus the memory cell 11 would not have been read or written into.

Figure 3:
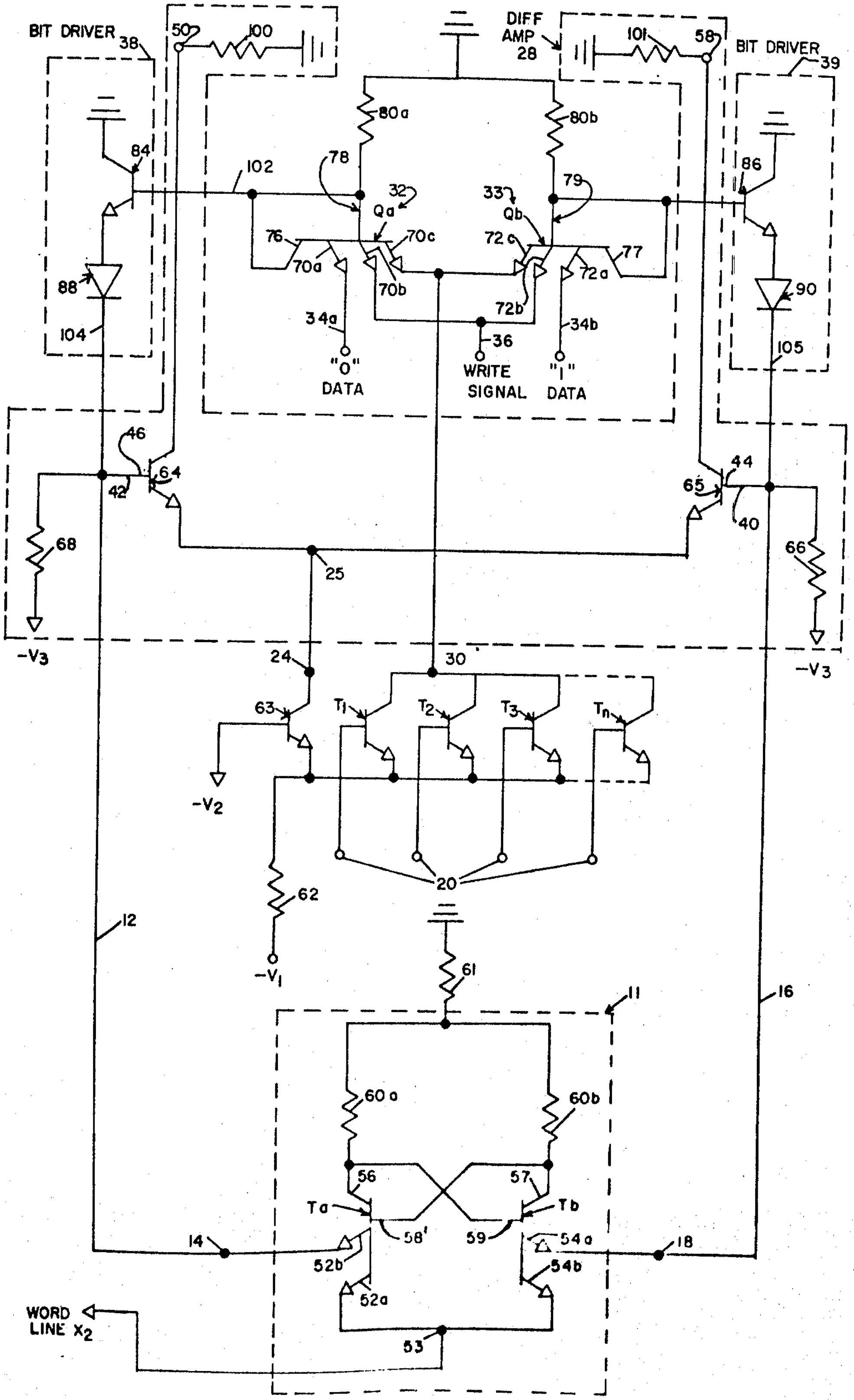
FIG. 3 is a schematic drawing of the circuit utilized for the system of FIG. 2.

The detailed circuit of the present invention may be best understood by referring to FIG. 3. The memory cell 11 is comprised of two dual emitter transistor devices T*a* and T*b*. Each dual emitter transistor device consists of two emitters 52*a*, 52*b* or 54*a*, 54*b*, having a common collector 56 or 57 and a common base 58′ or 59. The common collector 56 of the dual emitter transistor device T*a* is connected to the common base 59 of the dual emitter transistor device T*b* and the common base 58 of the dual emitter transistor device T*a* is connected to the common collector 57 of the dual emitter transistor device T*b* such that the dual emitter transistor devices are connected in a bistable multivibrator configuration. The emitter 52*a* of transistor T*a* is connected to the emitter 54*b* of transistor T*b* at the common node 53. The emitter 52*b* of transistor T*a* is connected to the line 12, and the emitter 54*a* of transistor T*b* is connected to the line 16. The common collector 56 is connected to one side of an impedance 60*a* and the common collector of 57 is connected to one side of an impedance 60*b*. Both impedances 60*a* and 60*b* are connected to one side of impedance 61. The other side of the impedance 61 is connected to ground.

The word drive signal is connected to the node 53 through the word line $X_2$. The word drive signal is of sufficient magnitude to bring the voltage of node 53 to a higher voltage than the voltage at the emitters 52*b* and 54*a* of the transistors T*a* and T*b*, in the absence of a write signal. Write signals appearing on lines 12 or 16 bring the emitters 52*b* or 54*a* of the transistors T*a* or T*b*, respectively, to approximately the same voltage as the emitters 52*a* and 54*b* of transistors T*a* and T*b* during the presence of a word/drive signal. When the memory cell 11 is in standby, i.e., when there is no word/drive signal, the emitters 52*a* and 54*b* assume a voltage lower than that ever appearing at the emitters 52*b* and 54*a*.

The decoder 22 is comprised of transistors Tl. . . . . .Tn (depending upon the number of bits in each word of the memory array) and a transistor 63. The emitters of all of the transistors in the decoder 22 are connected to each other and to one end of the resistor 62. The other end of the resistor 62 is connected to a fixed voltage-V*l*. The collectors of transistors T*l*. . . T*n* are connected to each other and to the out-of-phase output 30 of the decoder. The logic inputs 20 are connected to the bases of transistors T*l*. . . T*n* and the base of transistor 63 is connected to a fixed reference voltage—V2. The collector of transistor 63 is connected to the in-phase output 24 of the decoder 22. The resistor 62 and the voltages —V1 and —V2 are designed such that when any of the inputs to the bases of transistors T*l*. . . . T*n* are in the up or "one" state, current will flow through the collectors connected to the out-of-phase output 30 through any of the transistors T*l*. . . . T*n* connected to a signal in the up or "one" state and through the resistor 62 to the fixed voltage —V1. The voltage developed across the resistor 62 by the current flow is sufficiently high to cut off transistor 63. Thus, if any of the logic signals through input lines 20 are in the "one" state, the out-of-phase output 30 will be in the down or "zero" state and the in-phase output 24 will be in the up or "one" state. When all of the signals through the input lines 20 are in the "zero" state, the voltage —V2 is sufficient to cause the transistor 63 to conduct and the voltage developed by such conduction across resistor 62 keeps the transistors T*l*. . . . T*n* cut off. Under these circumstances, the out-of-phase output 30 will be in the up or "one" state and the in-phase output 24 will be in the down or "zero" state.

The differential amplifier 28 is comprised of two transistors 64 and 65 having their emitters connected to each other, to the gating input 25 and to the in-phase output 24 of the decoder 22. The collector of the transistor 64 is connected to the output 50 of the differential amplifier, and to resistor 100 which is connected to ground; the collector of the transistor 65 is connected to the output 58 of the differential amplifier and to resistor 101 which is connected to ground. The base 46 of the transistor 64 is connected to the emitter 52b of the transistor Ta through lines 42 and 12, and to one side of the resistor 68. The other side of the resistor 68 is connected to a fixed voltage —V3. The base 44 of the transistor 65 is connected (by means of lines 40 and 16) to the emitter **54*a*** of transistor T*b* and to one side of a resistor 66. The base 44 of transistor 65 and the base 46 of transistor 64 are respectively the inputs to the differential amplifier 28. The other side of the resistor 66 is connected to the same fixed voltage —V3. The resistors 66 and 68, and the fixed voltage —V3, are designed so that the stray capacitances along the lines 16 and 12 are discharged with sufficient rapidity to permit the next subsequent read or write operation on the memory cell 11 to be performed.

The bit driver gate 32 is comprised of a triple emitter transistor device Q*a* and the bit driver gate 33 is comprised of a triple emitter transistor device Q*b*. Each of the triple emitter transistor devices consists of three emitters, **70*a*, 70*b*, 70*c* or 72*a*, 72 *b*, 72*c* connected to a common collector 76 or 77 and a common base 78 or 79. The common collector 76 is connected to the common base 78** of the triple emitter transistor device Q*a* and the common collector 77 is connected to the common base 79 of the triple emitter transistor device Q*b*. The emitter **70*c*** of transistor Q*a* is connected to the emitter **72*c*** of transistor Q*b* and to the out-of-phase output 30 of the decoder. The emitter **70*b*** of transistor Q*a* is connected to the emitter **72*b*** of transistor Q*b* and to the write signal through line 36. The "zero" data input is connected through line **34*a* to the emitter 70*a*** of transistor Q*a* and the "one" data input is connected through line **34*b* to the emitter 72*a*** of transistor Q*b*. The common collector 76 is also connected to the common base 78 and to output line 102 of the bit driver gate 32. The common collector 77 is connected to the common base 79 and to the output 103 of the bit driver gate 33.

The bit driver 38 comprises a transistor 84 and a diode 88. The bit driver 39 comprises a transistor 86 and a diode 90. The base of the transistor 84 is connected to the output line 102 of the gate 32 and the base of the transistor 86 is connected to the output line 103 of the gate 33. The emitter of the transistor 84 is connected to the anode of the diode 88 and the cathode of the diode 88 is connected to the base of the transistor 64 through line 104 and to the emitter 52b of the transistor Ta through line 12. The emitter of the transistor 86 is connected to the anode of the diode 90 and the cathode of the diode 90 is connected to the base of the transistor 65 through the line 105 and to the emitter **54*a* of the transistor Tb through line 16. The collectors of transistors 84 and 86** are both connected directly to ground.

CIRCUIT OPERATION

When there is no word driver signal through the word line $X_2$, the voltage at the node 53 prevents conduction through either emitters **52*b* or 54*a*** of transistors T*a* or T*b*. The appearance of a word drive signal through the word line $X_2$ raises the voltage at the node 53, and thus the voltage at the emitters **52*a* or 54*b*** of transistors T*a* or T*b* sufficiently to permit conduction through emitters **52*b* or 54*a*** of transistor T*a* or T*b*, depending upon the state of the memory cell 11. If the memory cell 11 were in the "one" state, transistor T*a* would be in conduction, and transistor T*b* would be cut off.

Assume that the memory is programmed so that a "zero" is to be written into the memory cell 11, i.e., to cause conduction through transistor T*b* rather than through transistor T*a*. All of the signals along the logic input lines 20 are in the "-zero" state and thus transistors T*l*. . .T*n* of the decoder 22 are cut off and transistor 63 is switched into conduction. The conduction of transistor 63 provides a current path through the emitters of transistors 64 and 65 of the differential amplifier 28 to the power supply —V1 through the resistor 62. The nonconduction through any of the transistors T*l*. . . .T*n* prevents conduction through either emitter **70*c* or 72*c*** of transistor Q*a* or Q*b* of the bit driver gates 32 and 33, respectively. The write signal provides a high voltage at the emitters **70*b* and 72*b*** of transistors Q*a* and Q*b* and thus prevents conduction through either of those emitters. The "one" data signal is in the down state and thus provides a current path through the emitter **72*a*** of transistor Q*b* which prevents transistor 86 from conducting. The "zero" data input signal is in the up state and thus prevents current from flowing through the emitter **70*a*** of transistor Q*a*. Since current cannot flow through any of the emitters of the triple emitter transistor device Q*a*, current flows from ground through the resistor **80*a* and into the base of the transistor 84 of the bit driver 38. This current is amplified by the transistor 84 and appears as a large drive signal at the emitter 52*b*** of the transistor T*a* of the memory cell 11. This large drive signal causes the voltage at the emitter **52*b*** of the transistor T*a* to rise sufficiently to cut off all conduction through the dual emitter transistor device T*a*. In this manner, the state of the memory cell 11 is switched and the dual emitter device T*b* remains in conduction and the dual transistor emitter device T*a* remains cut off when the drive signal from the bit driver 38 is removed.

If the system were programmed to write a "one" into the memory cell 11, the "one" data signal would have been in the up state, the "zero" data signal would have been in the down state and there would have been conduction through the emitter **70*a*** of transistor Q*a* rather than through the emitter **72*a*** of the transistor Q*b*. Under these circumstances current would have been provided to the base of the transistor 86 and a drive voltage would have appeared at the emitter **54*a* of the transistor Tb of the memory cell 11**. Since transistor T*b* was then already cut off, the memory cell would not have switched states and it would have remained in the "one" state. Of course, if the memory cell 11 had been in the "zero" state, the drive voltage at the emitter **54*a*** of the transistor T*b* would have switched the memory cell to the "one" state. If the memory cell 11 is to be read, the write signal is in the "zero" state and the voltage at the emitters **70*b* and 72*b*** of transistors Q*a* and Q*b* is low. Thus no current flows into the base of transistor 84 or into the base of transistor 86. Under these circumstances, the voltage of the emitter **52*b*** of the transistor T*a*, as caused by the state of the memory cell 11, appears at the base of the transistor 64 through lines 12 and 42 while the voltage at the emitter **54*a*** of the transistor T*b*, as caused by the state of the memory cell 11, appears at the base of the transistor 65 through lines 16 and 40. If the memory cell 11 is in the "one" state, the voltage of the base of transistor 64 will be higher than the voltage at the base of transistor 65 and the transistor 64 will conduct. If, on the other hand, the memory cell 11 were in a "zero" state the voltage at the base of the transistor 65 would be higher than that at the base of transistor 64, and the transistor 65 would conduct, thereby keeping the transistor 64 cut off. The conduction of the transistor 64 would bring the voltage at the output 50 to a low value while the voltage at the output 58 would be high due to the lack of conduction through the transistor 65. If the transistor 65 were in conduction and the transistor 64 cut off, the relative voltages at the outputs 50 and 58 would be reversed.

When the memory cell is not to be read or written into, at least one of the signals along the input lines 20 is in the up state so that at least one of the transistors T*l*. . .Tis in conduction. The conduction through one of these transistors causes a current through the emitters 70*c* and 72*c* of the transistors Q*a* and Q*b* thus diverting current from the bases of the transistors 84 and 86 of the bit drivers 38 and 39, respectively, regardless of the state of the other inputs to the gates 32 and 33. There is thus no current signal through transistors 84 or 86 to the emitters of transistors T*a* or T*b*. The lack of conduction through transistor 63 will prevent the conduction through either transistor 64 or transistor 65 and thus inhibits the operation of the differential amplifier 28. In this situation there will be no drive signal to the memory cell 11 nor any indication of the output of the memory cell 11 even though there may be a word drive signal present through the word line X2. In this state any stray capacitances across the lines 12 and 16 will discharge through the resistors 68 and 66, respectively. Such discharge enables the circuit to respond to subsequent signals.

When there is no word drive signal along the word line $X_2$ emitters 52*a* or 54*b* of transistor T*a* or T*b* will conduct while emitters 52*b* or 54*a* of transistors T*a* and T*b* are cut off at all times. Under these circumstances, any signal from the bit drivers will not change the state of the memory cell 11 and the voltages appearing at the bases 65 and 64 are not determined by the state of the memory cell 11.

While the invention has been particularly shown and described with reference to preferred embodiments thereof, it will be understood by those skilled in the art that the foregoing and other changes in form and detail made be made therein without departing from the spirit and scope of the invention.

What is claimed is:

1. In a semiconductor memory comprising a plurality of words, each of said words having a plurality of storage cells;

word driver means for applying a particular word/drive signal to any one of said words;

selection means for reading from and writing into any one of said storage cells in any one of said words, said selection means having a number of decoders equal to the number of storage cells in any one of said plurality of words, said selection means having a first output in-phase with the inputs to said selection means and a second output out-of-phase with the inputs to said selection means.

2. A semiconductor memory in accordance with claim 1 wherein a number of storage cells are associated with each one of said number of decoders, said first output of one of said decoders enabling reading information from any one of said number of storage cells associated therewith.

3. A semiconductor memory in accordance with claim 2, said number of storage cells associated with each one of said number of decoders being comprised of one storage cell from each word.

4. A semiconductor memory in accordance with claim 2 wherein said second output of one of said decoders enables writing information into any one of the storage cells associated with said decoder.

5. A semiconductor memory in accordance with claim 4 wherein said selection means comprises reading means including a differential amplifier for sensing information in any one of said storage cells associated with said decoder.

6. A semiconductor memory in accordance with claim 5 wherein one differential amplifier is associated with each one of said number of decoders.

7. A semiconductor memory in accordance with claim 6 wherein said differential amplifier comprises at least two transistors, the emitters of both of said differential amplifier transistors being connected to said first output of one of said associated decoders.

8. A semiconductor memory in accordance with claim 4 wherein said writing means comprises at least two bit drivers.

9. A semiconductor memory in accordance with claim 8 wherein said writing means further comprises gating means;

said gating means comprises two transistor means, the emitters of each of said two transistor means being connected to said second decoder output.

10. A semiconductor memory in accordance with claim 8 wherein said bit driver comprises first and second current amplifiers, each current amplifier comprises a transistor and a diode.

11. A semiconductor memory in accordance with claim 10 wherein said writing means further comprises gating means, said gating means comprises two transistor means, the emitters of each of said two transistor means being connected to said second decoder output, the output of one of said two transistor means is connected to the input of one of said two bit drivers, the output of the other of said two transistor means is connected to the input of the other of said two bit drivers.

12. A semiconductor memory in accordance with claim 11 wherein the output of said first bit driver is connected to said storage cells associated with one of said decoders for writing information therein corresponding to one of two states, the output of said second bit driver is connected to said storage cells associated with same one of said decoders for writing information therein corresponding to the other of said two states.

13. A semiconductor memory in accordance with claim 11 wherein each of said two transistor means of said gating means comprises a three emitter transistor device.

14. A semiconductor memory in accordance with claim 13 wherein the base and collector of each three emitter transistor devices are connected together.

15. A semiconductor memory in accordance with claim 13 wherein a first, second, and third input line are respectively connected to each of said three emitters, said second output of said decoders enabling said gating means is connected to said first input line of said first three emitter transistor device and to said first input line of said second three emitter transistor device.

16. A semiconductor memory in accordance with claim 15 wherein a write enable signal is connected to said second input line of said first three emitter transistor device and to said second input line of said second three emitter transistor device for enabling information to be written into each of said associated storage cells.

17. A semiconductor memory in accordance with claim 16 wherein a first data signal is connected to said third input line of said first three emitter transistor device for enabling said associated storage cells to be set to one of said two states, a second data signal is connected to said third input line of said second three emitter transistor device to enable said associated storage cells to be set to said second of said two states.

18. A semiconductor memory in accordance with claim 1 wherein one of said number of decoders comprises a plurality of transistors having common emitters and common collectors, said common collectors being connected to said out-of-phase second output, and an associated transistor having the emitter connected to said common emitters of said plurality of decoder transistors and the collector connected to said in-phase first output.

19. A semiconductor memory in accordance with claim 18 wherein said common emitters of said plurality of decoder transistors are connected to a first fixed voltage through impedance means, the base of said associated transistor is connected to a second fixed voltage means, and each of the bases of said plurality of decoder transistors is connected to an individual address line.

20. A semiconductor memory in accordance with claim 13 wherein said common base of said first three emitter transistor device and said common base of said second three emitter transistor device are connected to current providing means.

21. A semiconductor memory in accordance with claim 11 wherein said one bit driver having the base of its transistor connected to said common collectors of said first three emitter transistor device and the emitter of its transistor connected to the anode of said diode, the cathode of said diode being connected to the base of a differential amplifiler transistor and to said associated storage cells, said second bit driver having the base of its transistor connected to said common collectors of said second three emitter transistor device and the emitter of its transistor connected to the anode of said diode, the cathode of said diode being connected to the base of a differential amplifier transistor and to said associated storage cells.

22. A semiconductor memory in accordance with claim 21 wherein impedance means are connected to each of the cathodes of said diodes, said impedance means are connected to a fixed voltage.

23. A semiconductor memory system for reading information from and writing information into an array of storage cells of a plurality of words comprising means for sensing the state of said storage cells in said array;

writing means for writing information into each of said storage cells in said array; and decoding means for selecting groups of storage cells, said decoding means having a first output in-phase with its input and a second output out-of-phase with its input.

24. A semiconductor memory system in accordance with claim 23 wherein said first decoding means output enabling said sensing means, said second decoding means output enabling said writing means.

* * * * *